June 17, 1930.  F. C. RYDER  1,764,856
AUTOMOBILE GLARE SHIELD
Filed July 12, 1927   2 Sheets-Sheet 1

Inventor
F. C. Ryder
By Lacey & Lacey, Attorneys

June 17, 1930. F. C. RYDER 1,764,856
AUTOMOBILE GLARE SHIELD
Filed July 12, 1927 2 Sheets-Sheet 2
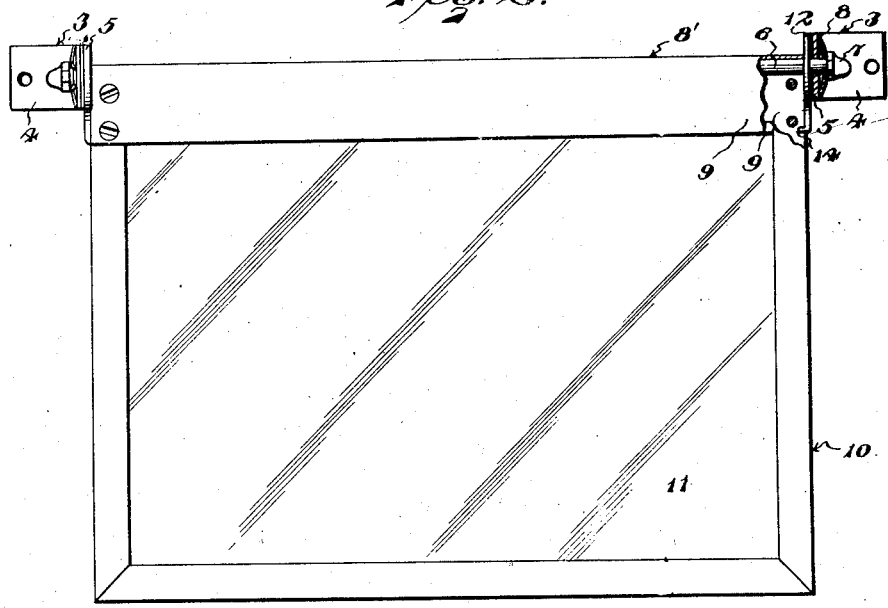
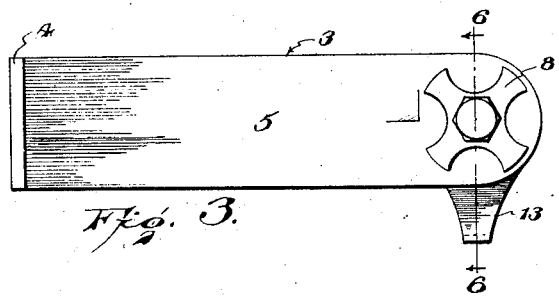
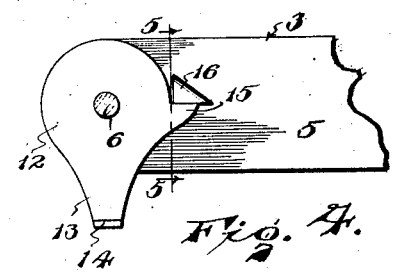
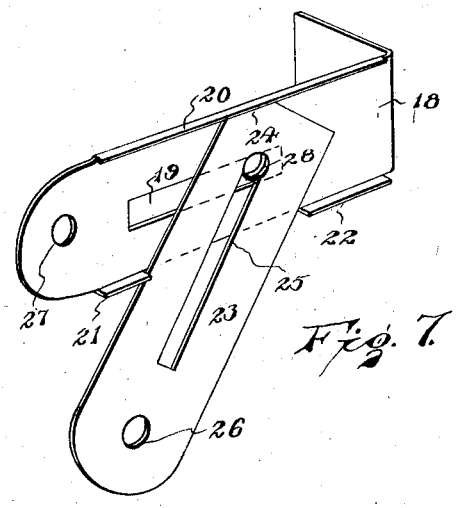
Inventor
F. C. Ryder
By Lacey & Lacey, Attorneys Patented June 17, 1930

1,764,856

UNITED STATES PATENT OFFICE

FOREST C. RYDER, OF ELGIN, OREGON

AUTOMOBILE GLARE SHIELD

Application filed July 12, 1927. Serial No. 205,209.

The present invention is directed to improvements in glare shields for automobiles.

The primary object of the invention is to provide a device of this character so constructed that it can be conveniently attached to the windshield frame of an automobile, the construction being such that it can be quickly adjusted for use or removed or adjusted out of the way.

Another object of the invention is to provide a device of this character so constructed that the shield can be adjusted forwardly and rearwardly and also downwardly in order that the shield may be properly positioned in the line of vision of the driver and to accommodate the usual windshield wiper.

In the accompanying drawing:

Figure 2 is a rear elevation of the device.

Figure 3 is a side view of the brackets.

Figure 4 is a sectional view on line 4—4 of Figure 2.

Figure 5 is a sectional view on line 5—5 of Figure 4.

Figure 7 is a perspective view of a modified form of the invention.

Figure 1:
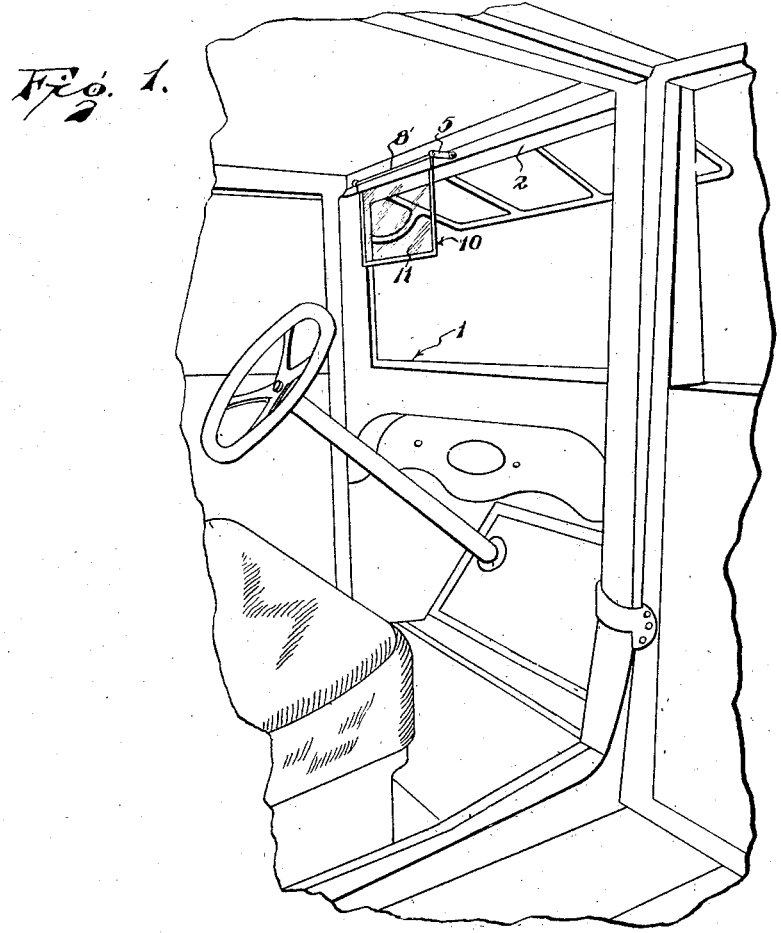
Figure 1 is a perspective view of the device showing it applied.
Figure 6:
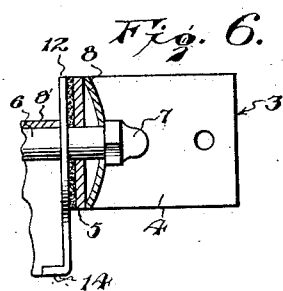
Figure 6 is a sectional view on line 6—6 of Figure 3.

Referring to the drawing: 1 designates the usual windshield frame and to the upper rail 2 of which is secured a pair of brackets 3, which include attaching flanges 4 and arms 5 in which are rotatably mounted the ends of the rod 6, said rod having threaded thereon cap nuts 7. Interposed between the arms 5 and nuts 7 are resilient washers 8 which yieldably engage the arms to hold the device in adjusted position upon manipulation of the cap nuts.

The rod 6 has engaged thereon a bar 8' formed from sheet metal and folded to engage said rod, thus providing plates 9—9, and between which the side rails of the frame 10 are secured, said frame serving to support the glass panel 11 of any desired color.

Engaged upon the ends of the rod 6 and abutting the end of the bar 8' are circular heads 12 having extensions 13 carried thereby, said extensions having their ends provided with projections 14 adapted to extend between the plates 9—9 in order to interlock the heads with said bar.

The heads 12 are further provided with shoulders 15 which are adapted to coact with instruck tongues 16 carried by the arms 5. Since the shoulders 15 engage the tongues 16 the frame 10 and its associated parts will be held in true parallel relation with respect to the windshield of the automobile. It will be of course understood that the nuts 7 are manipulated to compress the washers 8, thus holding the frame 10 against movement. It will be apparent that when the nuts 7 are screwed up against the resilient washer 8, to proper tension, the frame 10 can be swung up or down, and will stay in any position, in the line of the driver's vision or above the line of vision, without any further adjustment of said nuts 7. Fiber washers 17 are interposed between the heads 12 and arms 5 to more effectively maintain the parts in proper position.

In the modified form of the invention, as shown in Figure 7, the brackets consist of arms 18 for attachment to the windshield frame, said arms having longitudinal slots formed therein and provided upon their upper edges with flanges 20 and upon their lower edges with spaced flanges 21 and 22. Coacting with the arms 18 are link plates 23 having beveled corners 24 and are further provided with longitudinal slots 25 adapted to register with the slots 19. Normally the link plates 23 lie along the sides of the arms 18 and at which time the perforations 26 formed therein may register with the perforations 27 formed in said arms or extend beyond, and it is in these perforations that were formerly together that the ends of the rod 6 are engaged. If the link plate 23 is extended beyond and parallel with bracket 18 the perforations 26 engage with the ends of the rod 6, a clamping bolt 28 being engaged in the slots 19 and 25 to hold the parts in proper relationship. It will be obvious that the link plates 23 may be slid inwardly, or outwardly, and downwardly and in this instance the rod 6 is supported in the perforations 26. In this manner the frame 10 may be adjusted inwardly or outwardly, and if it is desired to lower the frame the link plate 23 is placed in the position shown in Figure 7, at which time the beveled corner 24 engages the flange 20 and the link occupies the space between the flanges 21 and 22, thus maintaining the plate in the position shown, and at which time the rod 6 will engage in the perforations 26. Said link plates 23 may also be slid farther so that the slots 25 will straddle or fit over the flange 21, at which time the beveled corner 24 engages the flange 20, thus maintaining the plate 11 farther from the windshield than shown in Figure 7.

From the foregoing description it will be seen that a glare shield has been provided for automobiles or other vehicles which will serve for intercepting the glare of approaching headlights of automobiles or the like.

Having thus described the invention, I claim:

1. A glare shield including a pair of brackets comprising arms, tongues carried by the arms, a rod having its ends journaled in the arms, a bar including a pair of spaced plates adapted to confine the rod, a frame secured between the plates of the bar for supporting a glass panel, circular heads rotatably engaged upon the rod and having extensions carried thereby provided with projections for engagement between the plates of the bar, said heads having shoulders carried thereby for engagement with said tongues to limit the swinging movement of the frame in one direction, and yieldable means for maintaining the frame in adjusted positions.

2. A glare shield including a pair of brackets comprising arms, a rod having its ends journaled in the arms, a bar engaged with the rod and including spaced plates and between which the rod extends, a frame engaged with the bar, heads rotatably engaged upon the ends of the rod and having projections carried thereby for engagement between the plates of said bar to prevent relative movement of the bar and head, said heads having shoulders carried thereby, tongues carried by the arms for engagement with the shoulders, resilient washers engaged upon the ends of the rod, nuts threaded upon the ends of the rod, said nuts serving to compress the washers to hold the frame in adjusted positions.

In testimony whereof I affix my signature.

FOREST C. RYDER. [L. S.]